United States Patent [19]
Kubitz

[11] Patent Number: 6,129,271
[45] Date of Patent: Oct. 10, 2000

[54] ELECTRONIC FUNDS TRANSFER NETWORK TEST SYSTEM

[75] Inventor: Carl Kubitz, Scottsdale, Ariz.

[73] Assignee: Lexcel Solutions, Inc., Scottsdale, Ariz.

[21] Appl. No.: 09/070,225

[22] Filed: Apr. 30, 1998

[51] Int. Cl.[7] .................................................. G06F 17/60
[52] U.S. Cl. ............................................ 235/379; 705/39
[58] Field of Search ............................... 235/379; 705/35, 705/39, 40, 41, 42, 43, 44

[56] References Cited

U.S. PATENT DOCUMENTS

| | | | |
|---|---|---|---|
| 5,187,732 | 2/1993 | Suzuki | 379/5 |
| 5,784,558 | 7/1998 | Emerson et al. | 395/200.6 |
| 5,805,571 | 9/1998 | Zwan et al. | 370/249 |
| 5,808,920 | 9/1998 | Zwan et al. | 364/579 |
| 5,881,237 | 3/1999 | Schwaller et al. | 395/200.54 |

*Primary Examiner*—Karl D Frech

[57] ABSTRACT

A system is described which permits a financial institution to provide for testing of software and equipment which is intended for use in an electronic funds transfer network. The system permits the validation of the software and equipment without requiring utilizing the electronic funds transfer central switch which would otherwise process electronic funds transfers.

1 Claim, 3 Drawing Sheets

ELECTRONIC FUNDS TRANSFER NETWORK TEST SYSTEM

FIELD OF THE INVENTION

The invention pertains to electronic funds transfer systems, in general, and to a test system for electronic fluids transfer networks for banking financial transaction systems, in particular.

BACKGROUND OF THE INVENTION

Financial institutions such as banks and credit card companies need to exchange information about their customers' accounts.

By way of example, if a customer walks into a bank to deposit money, or walks up to an automatic teller machine (ATM) to withdraw money, the bank can check its own customer files to authorize the transaction. The transaction never leaves the bank. However, if that same 1 customer walks up to an ATM owned by a second bank, the second bank's computer determines that this is not one of its own cards. The second bank has to check with the first bank to ensure that the funds are available.

The banks do not communicate directly with each other. Instead, they both communicate with a central organization that acts as a clearing house providing an electronic data interchange. Examples of such central clearing houses are Star, Mac, Plus, and Explore. These organizations provide services to their member institutions. Their main technical role is to operate a computer, called a "switch", that manages the exchange of these transactions. The first six digits of an ATM card are the bank identification number. The ATM card number is provided to a switch which in turn identifies the destination bank and routes the accompanying transaction. ATMs display the logos of the central clearing house systems which they recognize. Credit and debit cards in people's wallets display these same names.

Central clearing house switches also provides a settlement function. Once a day the central clearing house switch stores all transactions for the previous 24 hours in a file, and sends reports to its member banks electronically. For example, if a cardholder of a first bank withdrew $100 from an ATM of a second bank, the clearing house switch goes through a settlement process to reconcile the two accounts, debiting the first bank and crediting the second bank.

Central clearing house switches offers banks an electronic interchange of data while imposing strict regulations and security. It allows a local bank to establish a regional, a national, and even an international presence. Through central clearing house switches many banks are connected and a network of switches allows a customer to walk up to an ATM in a foreign country, insert their card, and receive local currency.

Banks communicate with central clearing house switches following the standards and procedures set by the organization that runs each switch. Each organization publishes a set of interface specifications describing how to connect, what the format of the message must be, what security requirements are required, and what federal and state regulations to follow.

Banks obtain a copy of these specifications and use it to build a computer interface between their computer system and the switch. Their interface must comply with these specifications before they are allowed to connect to the switch.

The organizations that run the switches provide consulting expertise, for a fee, to assist banks in the development of their interface. After development comes testing, then usually more development, more testing, and finally certification. To pass certification, the bank's interface must satisfactorily accomplish a certain set of transactions and withstand certain types of failures.

The flow and the content of the messages must be strictly adhered to and so the bank's new software interface must be rigorously tested. However, test time on the switch is difficult to schedule, is only available in small time blocks, and is not always available at convenient times.

SUMMARY OF THE INVENTION

Instead of forcing banks to go through the lengthy and costly process of developing software, scheduling time on the switch, waiting for the test time, testing the software, finding errors, and starting all over again, applicants have created a system and method that permits testing of systems which are intended to communicate with central financial systems or switch environment.

The system and apparatus of the invention mimics the specifications of the switch. All pre-certification testing can be done with a system in accordance with the invention. The banks equipment still must undergo final certification with the switch, but after operation of the equipment in conjunction with the system of the invention there is a greater likelihood that its interface will pass certification. The amount of time that a bank spends in testing online to the switch can be reduced by 70% or more.

Further in accordance with the invention, operational compliance is ensured by using a software program to test against specifications. People can accidentally miss things, especially when they are working with lines of software code all day. Using a software program ensures tighter compliance to the interface standards. Every specified condition is verified without introduction of human error.

BRIEF DESCRIPTION OF THE DRAWING

The invention will be better understood from a reading of the following detailed description in conjunction with the drawing figures in which like reference designators are used to identify like elements and in which.

DETAILED DESCRIPTION

Figure 1:
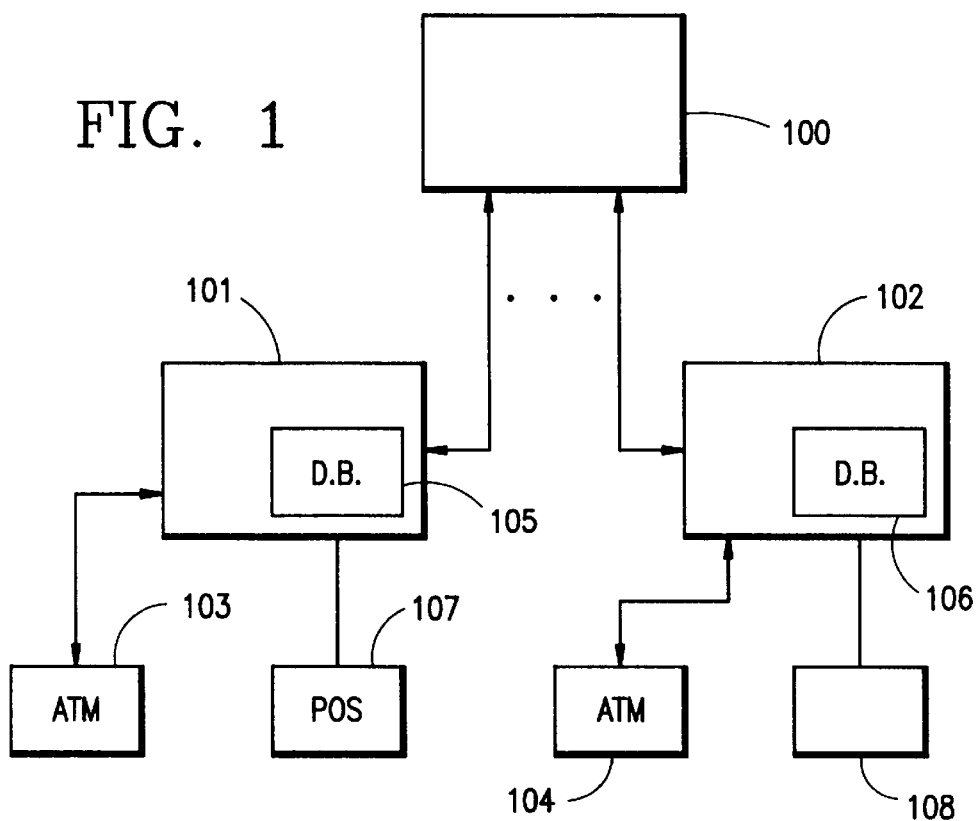
FIG. 1 is a block diagram of a prior art system to which the invention may advantageously be applied.

Turning now to FIG. 1, a financial network is shown in block diagram form. Computer interfaces are provided between financial institutions by means mainframe processors such as network processor 100. Each bank such as bank 101 and bank 102 includes one or more processors, which are not separately shown, that is operable to access processor 100. Bank 101 has one or more automatic teller machines (ATMs) 103 coupled thereto. Bank 101 may also have connections to one or more point of sale terminals 107. Bank 101 includes a customer database 105 stored in a memory and which is accessible by the bank processors. Similarly, bank 102 includes one or more processors, which are no separately shown, that is operable to access processor 100. Bank 102 has one or more ATMs coupled thereto and also may have connections to one or more point of sale terminals 108. Bank 102 also includes a customer database 106 stored in memory and which is accessible by the bank 102 processors. Database 106 includes account information for customers of bank 101. In operation, a customer might effect a transaction at ATM 103. Bank 101 would determine if the customer is a customer of bank 101. If it is determined that the customer is a bank 101 customer the bank processor checks the balance of the customer by accessing database 103 prior to dispensing funds. If however, the customer is not a bank 101 customer, but is a customer of bank 102, bank 101 will communicate to switch 100 to request account verification. Switch 100 will determine that the financial information should be directed to bank 102 and will transmit the financial information to bank 102. Bank 102 accesses data base 108 to determine account information relative to the customer and to adjust the customers account balance according to the customers deposit or withdrawal. Financial information relative to the transaction is forwarded to switch 100 which in turn communicates the information to bank 101 processors to in turn complete the financial transaction. Computer or switch 100 in addition to routing transaction information, performs settlement functions. Periodically, switch 100 stores all transactions for the predetermined period in a file and sends reports to member banks electronically. For example, if a customer of bank 101 withdraws money from an ATM 104 associated with bank 102, switch 100 initiates a settlement process to reconcile the two accounts by debiting bank 102 and crediting bank 101. Once a day, this transaction along with all other transactions in the prior 24 hour period is included in a reports sent to bank 101 and to bank 102.

Switch 100 offers banks an electronic interchange of data while imposing strict regulations and security. Switch 100 allows a bank such as bank 101 to establish a regional, national and even an international presence. Communication between banks 101 and switch 100 as well as between switch 102 and switch 100 follow standards and procedures set by the organization which runs switch 100. The organization publishes a set of interface specifications describing how to connect, to switch 100, what the message format must be, shat security requirements are required and what federal and state regulations to follow. Banks obtain a copy of these specifications and use it to build a computer interface between the banks computer system and switch 100. The interface must comply with these specifications before the bank is allowed to communicate directly with switch 100.

The flow and content of messages to switch 100 must be strictly adhered to and so the bank's new software interface must be rigorously tested. However, test time on switch 100 is difficult to schedule, is available only in small time blocks and is not always available at convenient times.

Figure 2:
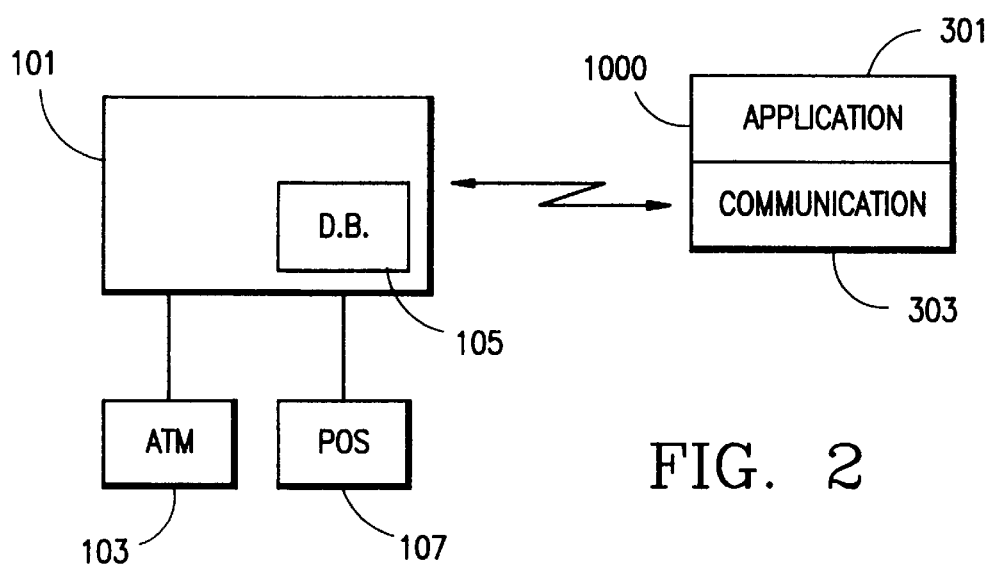
FIG. 2 is a block diagram of a system in accordance with the invention.

Instead of requiring banks to go through the lengthy and costly process of developing software, scheduling time on switch 100, waiting for the test time, testing the software, finding errors, and starting all over again, a system 1000 as shown in FIG. 2 is provided in accordance with the invention which simulates the environment of switch 100. A system in accordance with the invention mimics the specifications of switch 100. All pre-certification testing can be done at the banks 101. Bank 101 still must undergo final certification with switch 100, but switch there is a higher degree of confidence that the interface will pass certification.

The amount of time that a bank such as bank 101 spends in testing online to switch 100 can be reduced 70% or more in accordance with the principles of the invention.

In addition, compliance is ensured by using a software program to test against specifications. People can accidentally miss things, especially when they are working with lines of software code all day. Using a software program in accordance with the invention ensures tighter compliance with specifications for switch 100.

The process of testing and validating data exchanges between switch 100 and bank 101 is an iterative process. A system 1000 in accordance with the invention as shown in FIG. 2 receives data. The data is then compared to data standards. Differences between the data and the standards is logged and the data is transmitted.

System 1000 includes a communications component 301 and an applications component 303. The application component 301 is responsible for message processing, validation, and housekeeping—miscellaneous tasks such as opening any input/output files as well as a trace file. The communications component 303 includes standard communication protocols used in transmission.

Figure 3:
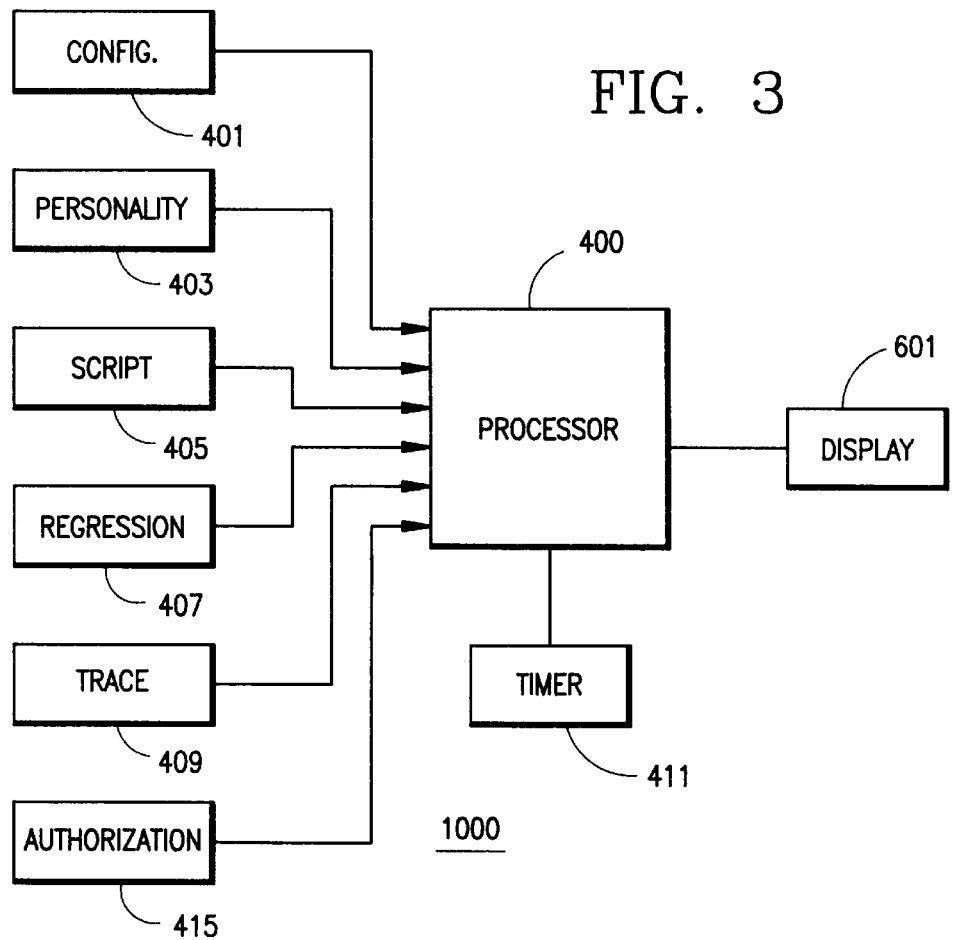
FIG. 3 is more detailed diagram of the system in accordance with the invention.

FIG. 3 illustrates system 1000 in greater detail. System 1000 includes a configuration file 401, a personality module 403, script file 405, a regression file 407, and a trace file 409. Configuration file 401 is used to store information about the test environment. For example, it may contain details about which message data fields are mandatory and which are optional. Users can change some of the data and message processing scenarios stored in configuration file 401.

Personality module 403 is a data table corresponding to the standards of switch 100 which data exchanges are to be tested against. Personality module 403 contains a definition of all messages and field values which are defined in the chosen data exchange standard and therefore are expected to be adhered to in the final test results.

Personality module 403 is a static table derived from specifications of switch 100. The static table defines all the possible kinds of messages that could be sent between bank 101 and switch 100. These messages, for example, could include an authorization request to switch 100, an authorization request response from switch 100, a financial transaction request to switch 100, and a network management message. Personality module 403 drives the message processing and validation. The application knows what to expect—what to validate and what to process.

Script file 405 is generated automatically and contains test scripts which systematically and exhaustively test all conditions of the data exchange with switch 100. Based on each line of the data table in the personality module 403, tests are generated to check for each condition. For example, if the standard defines a certain data exchange message with a field value greater than 0, a test will be generated to test that condition by sending a message with a field value equal to or less than 0.

Input from all three of the configuration file 401, personality module 403 and script file 405 is used to create trace file 407 and regression file 409. Various timers and authorization tables are checked as well.

Trace file 407 contains the results of the testing. It is a log file in text format containing messages and results. The results can be viewed and analyzed.

Regression file 409 contains the history of previous tests and allows the user to compare iterations of the testing process to create benchmarks and to note changes over time.

The regression analysis process also allows the incorporation of outside files. Processor 400 loads data from configuration file 401, personality module 403, and script file 405, checks timers 411 which control timing of data processing, and checks authorization table 415 which controls the authorization of the processing of messages.

Validation logic goes through data elements to determine if the files and modules are put together correctly and if they are exchanging data correctly.

Figure 4:
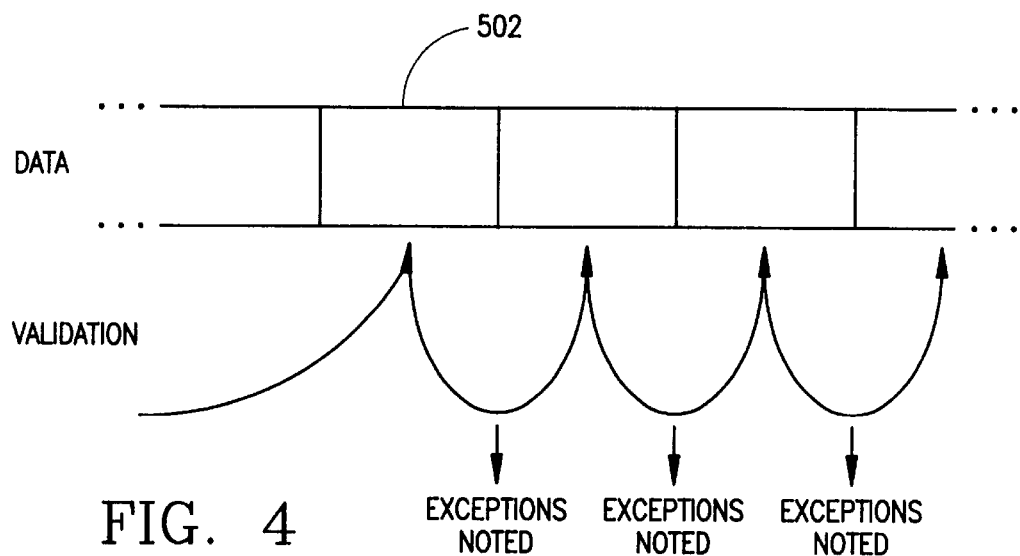
FIG. 4 illustrates the validation process utilized in accordance with the principles of the invention.

FIG. 4 illustrates the validation process utilized in accordance with the principles of the invention, with the validation criteria intercepting the data stream and comparing it to the chosen standard. As data is received from a bank 101, the data 501 is compared to a chosen standard. Each data message is processed by first identifying the message and breaking it down into fields. The message is checked to determine if each required field is present.

Data within each field is checked for length and to determine the kind of data. For example, if the standard specifies that this field is to contain a maximum of 8 characters, the validation will determine that the field contain a maximum of 8 alpha/numeric characters as specified in the standard.

Validation is applied to each field to determine if the number falls within an allowable range. Any time an exception is found, the exception is displayed on an operator console 601 and written to a trace file 409. Validation occurs rapidly. Messages flash on console 601. Trace file 407 lets the user examine the results of the testing at a later time. Another program, transaction viewer 611 reads trace file 409 and plays trace file 409 back for the user step by step. Trace file 409 shows what event occurred when. An input message, a validation check, a response, a key pressed—all of these appear in trace 409 file along with time stamps. All exceptions to the standard are highlighted.

Figure 5:
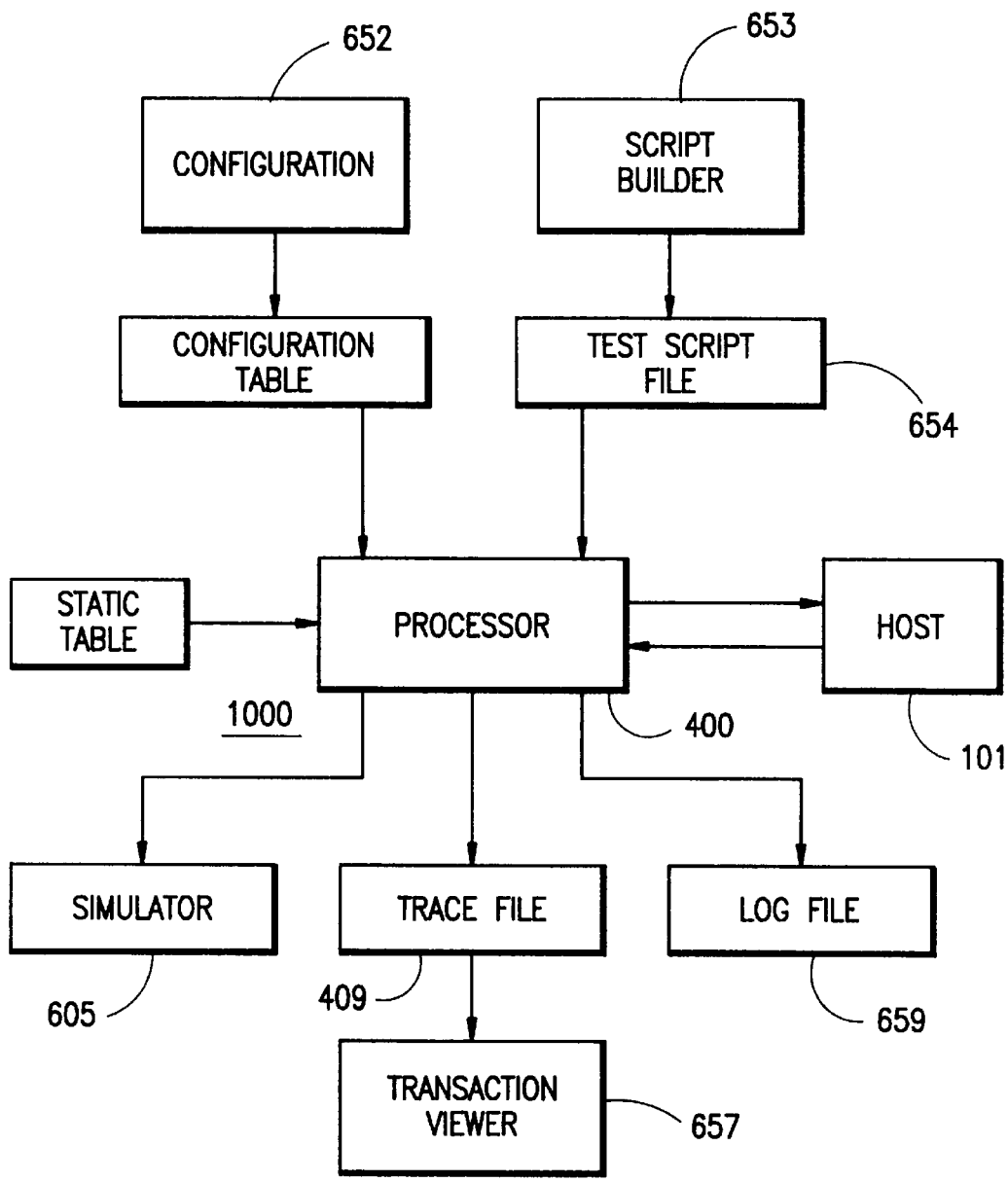
FIG. 5 illustrates in further detail a system in accordance with the invention.

FIG. 5 illustrates system 1000 in greater detail. In a preferred embodiment of the invention, a personal computer or processor 400 has a communications link to the host or bank 101. The system is configured to utilize a windows type of operating system environment. A person using system 1000 enters an application on PC 400 that adheres to standard Windows interface design. The program group consists of four programs: configuration 651, script builder 653, simulator 655, and transaction viewer 657.

Script builder 653 is programmed with information of the interface being tested and provides some standard optional, or standard scenarios. Typically a user of the system first creates a test script by double-clicking on the icon for the Script Builder program 653. In this program the user drags standard transactions from the lower half of the window to the upper half of the window to add them to a test script file 654.

Then the user selects a menu choice for the simulator 655. Simulator program 655 opens and the user clicks a button to send the test script from test script file 654 to system 101. The user can choose to examine the trace file 409. It contains every action taken, marked with a time stamp.

In the past, in order to save space in computer programs, programmers routinely assigned only two digits to the year. They also usually made the number 00 an invalid year. Now, with the year 2000 approaching, all the software in the world currently in use must be changed and tested to see how it will handle the year 2000.

The year 2000 involves many dependencies between hardware, application software, internal and external terminals, switches, routers and interfaces. Every financial application involves some sort of date, so the probability that a financial application is affected by the year 2000 issue is extremely high. The issue of interest calculations and other financial matters depends on reliable date counting.

This problem is especially critical in all software involving financial transactions because of the large volume of data processed and the large number of people affected.

There are methods to find date dependencies, and methods to change the software. However once the software is changed, the new version must undergo certification again. Manual testing is complex, tedious, and error prone. The automated solution for pre-certification testing provided in accordance with the invention is prudent and reliable. Besides testing for compliance with the prevailing standards, the system in accordance with the invention also specifically tests for year 2000 problems.

Most financial institutions are handling the year 2000 issue in one of two ways—Date Interpretation and Date Expansion. The simulator in accordance with the invention allows automated testing for both methods. The date interpretation solution involves defining a range of years to be in one century or another. The user sets parameters so that a two digit number in a range is defined as certain years in the 1900s or in the 2000s. For example, a bank may choose to set the digit range 00–49 to be the years 2000 to 2049 and the two digit range 50–99 to be the years 1950 to 1959. The date interpretation technique permits the span of years to be extended periodically by changing the window boundaries and notifying users and connected systems that the window is about to advance.

The date expansion method of dealing with the year 2000 problem requires changes to both date data and programs by converting all date references and uses from the two digit year format to a four digit year format. This method is a complete solution, but it is very time consuming and expensive as every date field in every line of code must be changed.

Depending on how a user has chosen to deal with the year 2000 problem, system 1000 tests in one of two ways. Thorough testing is required to ensure that existing applications and systems adapt to the new boundaries and handle all the date data calculations properly. System 1000 can check for this by setting a "Set Date Interpretation" menu choice to Yes and entering the ranges. While it checks for compliance with the selected standard, system 1000 also validates all date data based on those ranges.

System 1000 can also be configured to believe it is running in the next century merely by changing the date of the system clock in the PC 400.

If Date Interpretation is set, in the validation stage the software branches, reads the ranges, and returns to interpret all the dates in the messages based on those ranges. All errors are noted in the trace file 409. In addition, if the user has omitted some years from the range, those missing years are also flagged. For example, some businesses may choose to set 00–30 to the year 2000 and 70–99 to 1900, but leave the 31–69 range undecided for the moment.

System 1000 can also test the software at bank 101 if it is chosen to deal with the year 2000 through date expansion. The definition of the date field in the static table contained in regression table 407 is changed from 2 digits to 4 digits. Simulator 605 is run, and at the validation pass when the date field is examined, any date in a financial transaction message which does not conform to the new 4 digit field is flagged as an error.

By using the automatic Script Builder 653 with simulator 605, the user can create a library of test scripts in test script file 654 that perform a variety of "what if" year 2000 scenarios.

The year 2000 is a leap year, and the first business day is a Monday Jan. 3, 2000. This means there are at least six critical dates to test: 12/99, 01/00, 02/28, 02/29, 03/01, 09/99, as well as today and tomorrow.

In a first scenario, the Script Builder 653, may be used to create a transaction with a transmission date of Dec. 31, 1999 at 11:05 p.m. and a settlement date of Jan. 2, 2000 at 12:10 p.m. Simulator 605 sends the transaction to the host 101 for processing by the application software and validates the response from the host against the switch operating specifications embedded in the simulator 605.

In a second scenario, a variety of year 2000 transactions are created and responses to simulator 605 which is emulating switch 100 are checked The simulator 605 flags any transactions not in compliance with the switch 100 specifications. These errors can be analyzed to determine where the problem lies.

In a third scenario a script is created where the expiration date of the test card such as an ATM card occurs in the year 2002. The card generates a POS transaction for authorization on Feb. 2, 2000 and the authorization is denied.

The user can create scripts to test for other dates by using the Script Builder program and dragging standard transactions from the lower half of the screen to the upper half, then changing the date of the transaction.

Turning back to FIG. 5, system 1000 simulates switch 100 based upon the specifications of switch 100. Bank 101 communicates with system 1000 to simulate the actual data transfer that would go to switch 100. The communication link between bank 101 and system 1000 may be via modem over a telephone line or other communications links. System 1000 includes a communications interface that emulates or duplicates that of switch 100 so that when the bank 101 connects to system 1000, system 1000 will interface to the bank 101 to look like switch 100. Standard communications protocols are supported such as x.25.

A simulator has two components an application layer and a communications layer. The applications layer is responsible for message processing, validation and some housekeeping. The communications layers primary function is to determine if there is a piece of hardware required or whatever method it needs to talk to the host computer. The communications layer is access to host bank 101. In system 1000 a simulator 655 is bound with communications layers that have an X.25 interface. This X-25 interface interacts with a piece of hardware that has a physical connection to host bank 101.

The invention has been described in terms of specific embodiments and implementations. As will be appreciated by those skilled in the art, various modifications and changes may be made to the system of the present invention without departing from the spirit or scope of the invention. It is intended that the present invention be limited in scope only by the claims appended hereto.

What is claimed is:

1. A system for use in an electronic funds transfer network comprising a switch utilized for electronic funds transfers between two or more financial institutions, said system comprising:

a processor unit having a communications link accessible by at least one of said financial institutions;

a script builder program for generating preselected test protocols;

a script file for storing said test protocols;

means for validating data messages received from said at least one of said financial institutions;

a trace file for storing information obtained from said validating means; and said system initiates operation of said at least one financial institution by simulating one or more transactions on one or more preselected dates.

\* \* \* \* \*

UNITED STATES PATENT AND TRADEMARK OFFICE
CERTIFICATE OF CORRECTION

PATENT NO : 6,129,271
DATED : Oct. 10, 2000
INVENTOR(S) : Kubitz

It is certified that error appears in the above-identified patent and that said Letters Patent is hereby corrected as shown below:

Col. 1, line 6, "fluids" should read -- funds --
Col. 2, line 24, "banks" should read -- bank's --
Col. 3, line 1, "no" should read -- not --
Col. 3, line 19, "108" should read -- 106 --
Col. 3, line 20, "customers" should read -- customer's --
Col. 3, line 21, "customers" should read -- customer's --
Col. 3, line 34, "reports" should read -- report --
Col. 3, line 40, "banks" should read -- bank --
Col. 3, line 41, "switch" should read -- bank --
Col. 3, line 45, "shat" should read -- what --
Col. 3, line 48, "banks" should read -- bank's --
Col. 3, line 65, "banks" should read -- bank --
Col. 3, line 66, "switch" should be deleted
Col. 4, line 16, "301" should read -- 303 --
Col. 4, line 17, "303" should read -- 301 --
Col. 5, line 14, "501" should read -- 502 --

UNITED STATES PATENT AND TRADEMARK OFFICE
CERTIFICATE OF CORRECTION

PATENT NO : 6,129,271
DATED : Oct. 10, 2000
INVENTOR(S) : Kubitz

It is certified that error appears in the above-identified patent and that said Letters Patent is hereby corrected as shown below:

Col. 5, line 28, "407" should read -- 409 --
Col. 5, line 30, "611" should read -- 657 --
Col. 5, line 43, "651" should read -- 652 --
Col. 5, line 44, "655" should read -- 605 --
Col. 5, line 53, "655" should read -- 605 --
Col. 5, line 54, "655" should read -- 605 --
Col. 5, line 55, "system" should read -- host --
Col. 7, line 14, "checked" should read -- checked. --
Col. 8, line 8, "655" should read -- 605 --

Signed and Sealed this

Eighth Day of May, 2001

NICHOLAS P. GODICI

Attest:

Attesting Officer

Acting Director of the United States Patent and Trademark Office